Sept. 5, 1967 K. L. KARPE ETAL 3,339,455
PICTURE PROJECTOR APPARATUS WITH SOUND SYNCHRONIZED
WITH PROJECTED IMAGES
Filed June 29, 1965 4 Sheets-Sheet 1

INVENTORS
KENNETH LEE KARPE
MITCHELL J. BOGDANOWICZ
BY
Irving Seidman
ATTORNEY.

United States Patent Office 3,339,455
Patented Sept. 5, 1967

3,339,455
PICTURE PROJECTOR APPARATUS WITH SOUND SYNCHRONIZED WITH PROJECTED IMAGES
Kenneth Lee Karpe and Mitchell J. Bogdanowicz, New York, N.Y., assignors, by mesne assignments, to International Audio Visual Institute, Inc., New York, N.Y., a corporation of New York
Filed June 29, 1965, Ser. No. 467,833
19 Claims. (Cl. 88—27)

This invention relates generally to a sound slide film projector and, more particularly, to a compact portable machine which may be utilized for reproducing sound recordings and for projecting transparencies on a screen at an intermittent rate which is controlled by signals on the sound recording to thereby synchronize picture projection with the recorded sound.

So-called sound slide film machines have been widely utilized as instructional aids as well as for promotional purposes. For the most effective and efficient use of such machines it is essential that their operation be as simple and as uncomplicated as possible. Most machines now available require a screen to be positioned and/or aligned with the projected image; this procedure is time consuming and, as another drawback, requires a maximum amount of operating space. Additionally, most machines have elaborate film transport mechanisms which are complicated to operate and require the operator to manually adjust the film strip to ensure the first frame will be projected at the start of the sound recording. Thus, the systems of the prior art suffer from the inherent drawbacks that they are complicated to set up, and they are operable only with a maximum of difficulty. Hence, these prior art devices are particularly unsuitable as instructional or educational aids where the operator may be a school age child.

It is an object of the present invention to provide a sound slide film machine which is highly compact, portable and easy to operate.

It is another object of the present invention to provide a sound slide film machine incorporating an extremely simple and foolproof frame indexing mechanism.

Accordingly, the present invention comprises a casing having top, bottom, front, rear and side walls. A lamp housing, containing a lamp therein, is located in the casing adjacent the rear wall. A viewing screen is received in and forms a part of the front wall. A lens system is provided in front of the lamp and directs a beam of light through a picture frame and focuses the image formed thereby on the viewing screen. Hence, no extra space is required to erect and position a separate viewing screen as was required in the prior art devices. A disc jockey is provided and has a picture disc mounting wheel rotatably mounted thereon. The mounting wheel is provided with an arcuate projection across its face which is received in a complementarily formed arcuate slot in a picture disc to removably and nonrotatably mount the picture disc on the wheel. The picture disc contains a plurality of circumferentially, equally spaced picture frames therein; the frames lie on a circle whose axis is coaxial with the axis of the mounting wheel. The disc jockey per se is pivotally mounted within the casing and is movable through a slot in the side wall of the casing, between a first position wherein a frame in the picture disc is aligned with the beam of light and a second position wherein the mounting wheel is external to the interior of the casing so a picture disc can be mounted on or removed therefrom. The width of the casing slot is such that the projection on the mounting wheel cannot pass therethrough. However, a notch is provided on the side wall of the casing which communicates with the slot and allows passage of the projection therethrough when the projection is aligned with the notch. The picture disc is arranged so that when the mounting wheel is oriented so the projection will pass through the notch and the disc jockey is moved to the said first position, a preselected first picture frame will be aligned with the light beam to be projected on the screen. Thus, the present invention includes positive automatic indexing means which is simple in arrangement and easy to operate.

A turntable is mounted on the top wall of the casing and is driven by a motor mounted on the underside of the top wall. A tone arm is mounted on the top wall adjacent the turntable and contains a stylus therein which converts the undulations on a record mounted on the turntable into speech sounds through appropriate electrical circuitry located in the casing and a speaker mounted on the side wall of the casing. Each picture disc has a recording associated therewith which describes the projected image. Moreover, each respective recording associated with a particular picture disc contains a plurality of inaudible signals recorded therein which, when detected by the appropriate electrical circuitry, cause a solenoid to rotate the picture disc to position a succeeding frame in the light beam for each inaudible signal received, through appropriate gearing, to synchronize the projected image with the sound.

Accordingly, it is a feature of the present invention to provide a sound slide film projector having a picture disc mounting wheel cooperable with a portion of the casing to automatically index the picture disc.

It is another feature of the present invention to provide a sound slide film projector wherein the screen forms a portion of the casing thereby eliminating the need to position or align a screen in front of the projected image.

It is a further feature of the present invention to provide a sound slide film projector whereby movement of the picture disc is controlled by inaudible signals on an associated record.

On many occasions it may be desirable to remove the picture disc before the disc has completed one revolution. In this instance the projection on the mounting wheel will not be aligned with the notch on the casing.

Thus, another feature of the present invention is to locate the indexing notch in a door which is pivotable outwardly of the casing but is constrained from inward movement thereby allowing movement of the disc jockey from the first to the second position regardless of the orientation of the projection on the mounting wheel.

The above and other objects and features of the present invention will become more apparent from a consideration of the following detailed description when taken in conjunction with the drawings in which.

The drawings are substantially to scale of a working model of the present invention. Like numbers in the drawings indicate identical elements.

Casing

Figure 1:
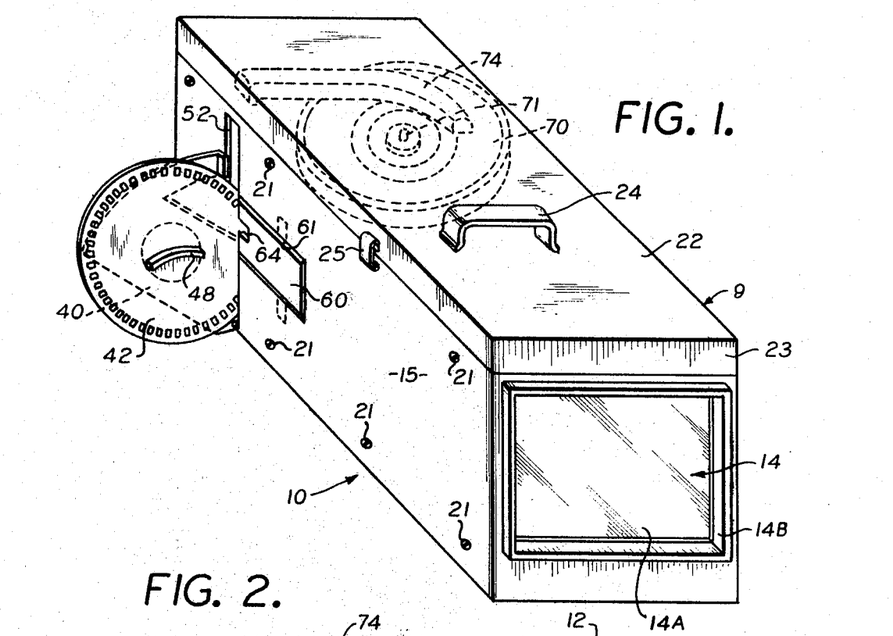
FIG. 1 is a perspective view of the sound slide film projector of the present invention.
Figure 3:
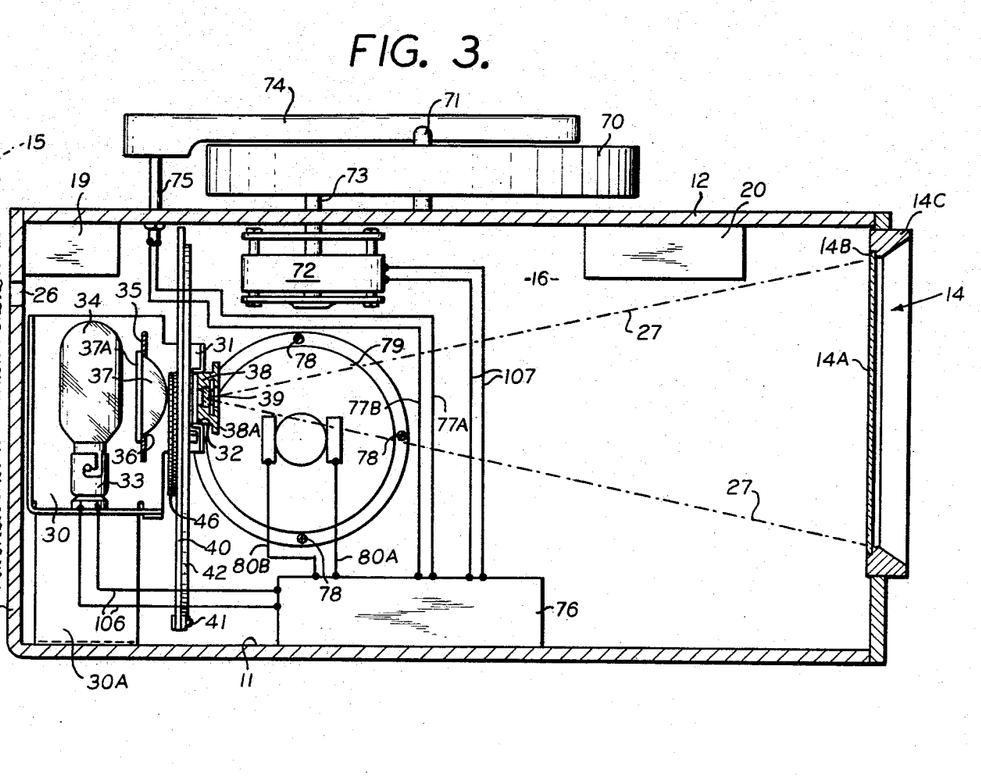
FIG. 3 is a vertical sectional view of the projector shown in FIG. 1, as seen from the side.

FIG. 1 illustrates the sound slide film projector of the present invention which includes a cover 9 and a casing 10. Casing 10 comprises a bottom wall 11, a top wall 12, a rear wall 13, a front wall 14 and respective side walls 15 and 16. The shelves 17 are located adjacent the upper and lower edges on the inner face of wall 16 and extend longitudinally along its entire length and respectively receive the edges of walls 12 and 11 therein to add a structural rigidity to the casing. Similarly, the shelves 18 are located adjacent the upper and lower (not shown) edge of side wall 15 and respectively receive walls 12 and 11 therein. A block 19 is located at the juncture of walls 12, 16 and 17 and is affixed in place by any conventional means, such as by gluing, and adds additional support for top wall 12. A second support block 20 (FIG. 3) is mounted on the undersurface of top wall 12 adjacent the front of the casing and extends transversely of the casing frame side wall 15 to side wall 16. It is to be understood that more or less extra support blocks may be utilized in the present invention and those shown here are by way of illustration only. Front wall 14 comprises a screen portion 14A which is received in a peripheral shelf 14B in a bezel 14C which forms a portion of front wall 14. As shown in FIG. 3, the members comprising bezel 14C flare outwardly from a point in front of screen 14A.

Ideally, the casing of the present invention may be made of plastic. Walls 11, 12, 13, 14 and 16 may be secured together in any conventional manner such as by gluing or they may be fabricated as a unitary structure. However, wall 15 is removably attached to the casing 10 to provide access to the interior of the casing as may be required from time to time. Thus, wall 15 has a plurality of apertures therein (not shown) adjacent the upper and lower edges which respectively receive screws 21 therethrough (FIG. 1) which are adapted to be screwed into appropriate studs (not shown) which extend vertically from the respective top and bottom walls to removably affix wall 15 in place.

Cover 9 comprises a top cover wall 22 substantially identical in shape and size to top wall 12. A peripheral wall 23 depends from top cover wall 22 and the bottom edge of peripheral wall 23 is adapted to abut the outer edge of top wall 12, when cover 9 is in place, to protect the elements mounted on the upper surface of wall 12 (as noted below). Cover 9 is provided with a handle 24 approximately centrally located and a plurality of conventional clasps 25 on wall 15 and walls 13 and 16 (not shown) connect cover 9 to casing 10.

Image reproducing mechanism

The image reproducing or projector portion of the present invention comprises, in part, a lamp housing 30 (FIG. 3) located in the interior of the casing adjacent rear wall 13. Lamp housing 30 is in the shape of a rectangular box having an open top and is affixed in place by a foot 30A depending from housing 30 which has a horizontally extending flange at the bottom thereof which, in turn, is mounted on the upper surface of bottom wall 11 by conventional means such as screws. Housing 30 further includes a projection 31 which extends longitudinally frontwardly and contains a threaded aperture 32 therethrough. Projection 31 is provided with a slot in the wall opposite side wall 15 for the purpose noted hereinbelow.

A lamp socket 33 is mounted on the bottom wall of housing 30 and receives a lamp 34 therein. Although FIG. 3 illustrates a bayonet connection between lamp 34 and socket 33, it is to be understood that this may be a threaded or any other type of mounting. In the preferred embodiment the lamp is approximately centrally located along the lateral axis of casing 10. A laterally extending slot 26 is provided in rear wall 13 and is positioned about and to the rear of housing 30 to allow the heat produced by lamp 34 to exit from the interior of casing 10. A deflector (not shown) may be placed over the open top of housing 30 to increase heat dissipation through slot 26. A partition 35 extends laterally across a portion of housing 30 between lamp 34 and projection 31 and contains an aperture 36 therein. The peripheral wall of aperture 36 conforms to the convex frontwardly surface of a condensing lens 37 which is received in aperture 36 to provide a snug fit which maintains lens 37 in place. The front surface of flange 37A on the rear of lens 37 abuts the rear surface of partition 35 to limit forward movement of lens 37 and to help position the lens when it is inserted into aperture 36. The condensing lens 37, in the conventional manner, forms a defined beam of light from the light emitted from lamp 34 to project the beam through a particular picture frame, as noted below. A threaded bushing 38, having a vertically extending peripheral flange 38A at the front surface thereof, is threadly received in aperture 32 in projection 31 and contains a focusing lens 39 in a central aperture therein which focuses the projected image on viewing screen 14A as indicated diagrammatically by the broken lines 27 in FIG. 3. The bushing may be moved laterally by screwing bushing 38 into aperture 32 to adjust the focus of the device.

A picture disc jockey 40 is provided and is pivotally mounted within casing 10 by the pivotal connection 41 and is adapted to position a picture frame, in a picture disc 42, between lenses 37 and 39 to be projected on viewing screen 14A. Disc jockey 40, which is preferably made of plastic, is shown in detail in FIG. 6 and includes an arcuate top edge 40A which terminates in a vertically projecting left edge 40B. The bottom edge of jockey 40 extends horizontally, a beveled edge joins the bottom edge with edge 40B. An aperture (not shown) is provided in jockey 40 adjacent the beveled edge and receives the pintle of pivotal connection 41 therethrough, the ends of which are in turn received in ears extending from wall 11 on either side of jockey 40, in the conventional manner. The right edge 40C of jockey 40 extends parallel to edge 40B and terminates in an extension 40D which extends toward the right, as taken in FIG. 6.

A circular recess 44 (FIG. 5) substantially centrally located, is provided in jockey 40. A bore 43, concentric to recess 44 and of slightly smaller diameter than recess 44 extends through jockey 40. A picture disc mounting wheel 45 comprising portions 45A and 45B, is rotatably mounted on jockey 40 with portion 45A being received in recess 44 and portion 45B, of slightly smaller diameter than and concentric to portion 45A, projecting through bore 43. A gear wheel 46 is fixedly connected to wheel 45 by screws 47 and is rotatable therewith. Wheel 46 is of larger diameter than bore 44 and is positioned on the rear of jockey 40 while wheel portion 45A is positioned on the front of jockey 40. As shown in FIG. 7, mounting wheel 45 has an arcuate projections 48 which extends across the face thereof.

The picture disc 42 is illustrated in FIG. 8 and comprises a disc having a plurality of substantially identical circumferentially equally spaced rectangular apertures 49 therethrough. That is, the axis of each aperture 49 lies on circle whose axis is coaxial with the axis of disc 42. In the preferred embodiment disc 42 is made of plastic and each aperture receives an 8 mm. picture frame 50 in a peripheral slot. Moreover, disc 42 is provided with a centrally located arcuate slot 51 therethrough which is adapted to snugly receive projection 48 on mounting wheel 45 therethrough to mount disc 42 on jockey 40. Ideally, the number of teeth on gear wheel 46 is equal to the number of picture frames 50 in disc 42.

Indexing mechanism

Disc jockey 40 is pivotable about connection 41 between a first position, wherein the jockey and associated disc 42 and wheel 45 are received within the aforementioned slot in housing 30 to align a picture frame between lenses 37 and 39 to project and focus the image on screen 14A (FIG. 4) and a second position wherein jockey 40 and wheel 45 lies exterior to casing 10 to provide for the removal and repacement of different discs 42 on wheel 45 (FIG. 1) through a slot 52 in wall 15. When jockey 40 is in the former position the bottom edge of jockey 40 rests on the upper surface of wall 11 to limit movement of the jockey. Moreover, a portion of jockey 40 lies outside of casing 10 so the jockey may be grasped and moved to the second position. The frame 50 being projected will fall below extension 40D, to the right of edge 40C (as taken in FIG. 4). When the jockey is in the latter position, the beveled edge will contact the upper surface of bottom wall 11 to provide a limitation on movement in the other direction.

Figures 2, 9, 10:
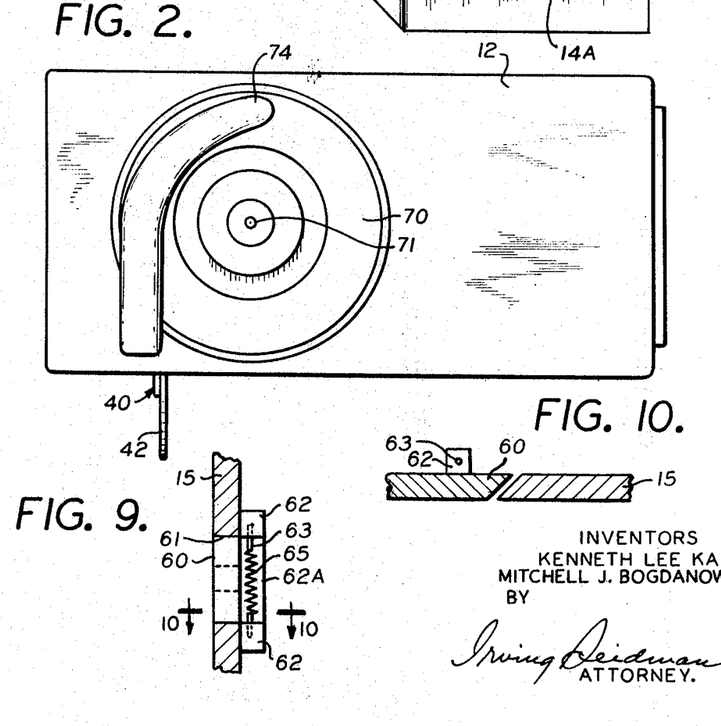
FIG. 2 is a top plan view of the projector shown in FIG. 1.
FIG. 9 is a detailed side elevational view of the door portion of the casing shown in FIG. 1.
FIG. 10 is a sectional view taken along lines 10—10 in FIG. 9.

An important feature of the present invention is the means for indexing picture disc 42 so a desired frame will be projected on screen 14A at the start of each cycle of operation. Thus, side wall 15 has a relatively large cutaway portion 61 in which a door 60 is mounted. As shown in FIG. 9, wall 15 is provided with substantially identical rectangular extensions 62 on the rear thereof respectively extending from the upper and lower edge of portion 61 adjacent the vertical edge. Extensions 62 receive vertically projecting pins 63 therein which extend into a rectangular extension 62A on the rear of door 60 to pivotally mount door 60 within cut-away portion 61.

Figure 5:
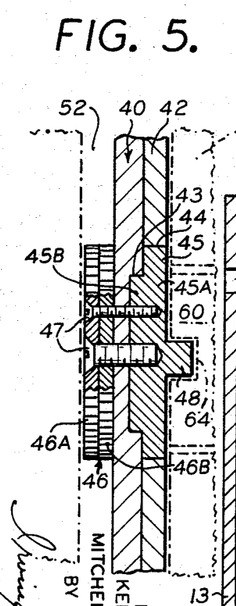
FIG. 5 is an enlarged detailed sectional view of the mounting wheel shown in FIG. 4.
Figures 6, 7, 8:
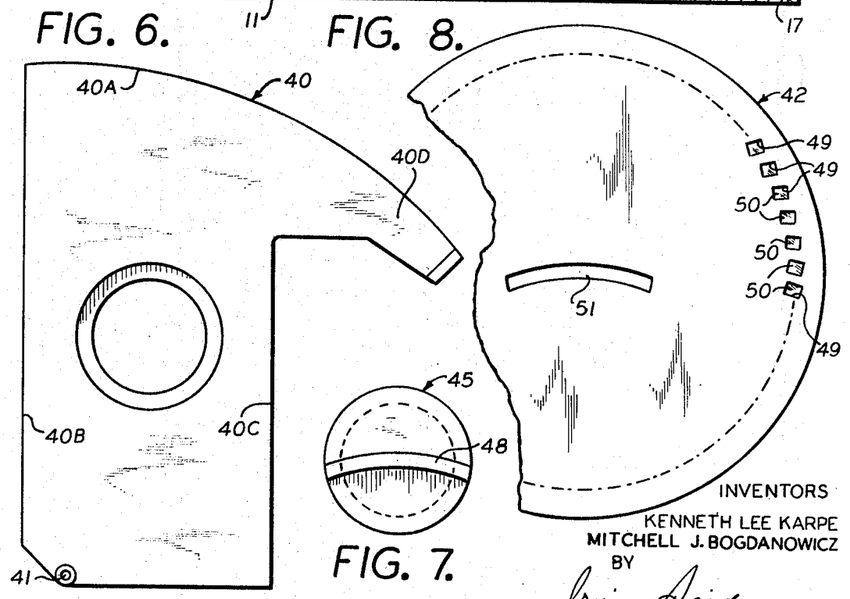
FIG. 6 is a front elevational view of the disc jockey shown in FIG. 4.
FIG. 7 is a detailed view of the picture disc mounting wheel.
FIG. 8 is a detailed view, with parts broken away, of the picture disc illustrated in FIGS. 1 and 4.

As shown in FIGS. 1 and 5, the rear edge of door 60 defines a portion of slot 52. The width of slot 52 is such that projection 48 extends past slot 52. However, door 60 is provided with a notch 64 which extends to the edge of slot 52 and is sized and positioned to allow passage of projection 48 therethrough when wheel 45 is oriented to align projection 48 with notch 64. Moreover, as shown in FIG. 10, the front edge of door 60 tapers inwardly frontwardly and is adapted to abut the vertical edge of portion 61, which tapers outwardly rearwardly to prevent movement of the portion of door 60 containing notch 64 inwardly. Hence, in accordance with one object of the invention, a simple indexing system is provided which prevents movement of jockey 40 toward the interior of casing 10 unless the mounting wheel 45 is oriented to align projection 48 with notch 64; a preselected picture frame being adapted to be aligned with the beam of light when wheel 45 is in said orientation.

If it is desired to remove picture disc 42 when jockey 40 is in picture showing position before projection 48 is again aligned with notch 64, all that is required is to move jockey 40 to the aforesaid second position. Projection 48 will abut door 60 and pivot the door about pins 63 to allow passage of jockey 40; it being understood that the height of door 60 is at least equal to the diameter of wheel 45. A conventional coiled tension spring 65 (FIG. 9) extends across door 60 between the extension 62A and the front edge and biases door 60 into shut position wherein the front edge of door 60 abuts the vertical edge of portion 61.

Sound reproducing mechanism

The sound reproducing portion of the present invention includes a turntable 70 (FIG. 2) fixedly mounted on a centrally located spindle 71 which is rotatably mounted on the top surface of top wall 12 by any conventional manner. An electric motor 72 is mounted on the underside of wall 12 and includes a vertically extending rotatable output shaft 73 which projects through a suitable aperture in wall 12 (not shown) and has a pulley (not shown) at the end thereof which contacts the flange of turntable 70 to rotate the turntable in the conventional manner.

A hollow pedestal 75 is fixedly mounted on and extends through wall 12 adjacent turntable 70 and wall 15 and pivotally supports a tone arm 74 thereon in the conventional manner. Tone arm 74 includes a portion which extends toward wall 16 and a portion which curves toward wall 14 so the tone arm (and turntable 70) lie within the periphery of wall 12 and can be covered by cover 9. Tone arm 74 houses a stylus (not shown) adjacent the front end in the conventional manner. The stylus converts the undulations on a recording into electrical impulses. These impulses are transmitted to electrical components within a box 76 on wall 11 via the leads 77A, 77B, which pass through pedestal 75 and connect the stylus with the electrical circuitry described in detail below.

A speaker 79 is mounted on wall 16 by the screws 78 which extend through apertures in the peripheral flange at the front of the speaker. Wall 16 may be provided with an appropriate aperture aligned with and coaxial with speaker 79 to provide for the dispersion of sound produced by the speaker. The speaker is connected to the electric circuitry within box 76 by the leads 80A, 80B.

Film advance mechanism

The record adapted to be used with the present invention and associated with a particular picture disc will have a plurality of inaudible signals recorded thereon, as noted above. Each signal will cause the film advance mechanism, through the electric circuit described below, to advance picture disc 42 one frame. Thus, each record associated with a different disc 42 may have a different plurality of signals thereon and/or a different spacing between signals so the picture on screen 14A will be synchronized with the sound produced by the associated record; it being understood that the picture frames are initially in a predetermined order.

Figure 4:
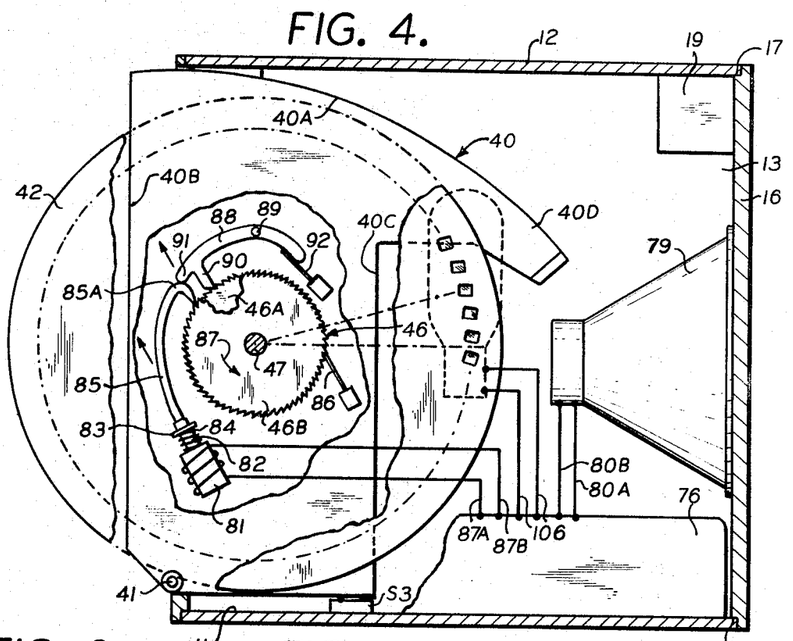
FIG. 4 is a vertical sectional view of the present invention as seen from the front, with parts broken away, illustrating the film advance mechanism.

As shown in FIGS. 4 and 5, gear wheel 46 comprises two gears 46A and 46B in face to face relation, each having the same number of teeth (which ideally correspond in number to the amount of frames 50 in disc 42); however, the teeth of gear 46A extend in a direction opposite to the direction that the teeth of gear 46B extend.

A solenoid 81 is mounted on disc jockey 40 by conventional means and is connected to the electric circuitry contained within box 76 by leads 87A, 87B. Solenoid 81 includes a movable shaft 82 having a washer 83 affixed thereto adjacent the end thereof. One end of a spring 84 abuts the solenoid and the other end of spring 84 abuts washer 83 to bias shaft 82 outwardly of solenoid 81; the maximum extension of shaft 82 is limited by a stop (not shown) on the other end of the shaft. An arm 85, having a hook 85A at the end thereof, is integral with shaft 82; hook 85A is adapted to engage teeth on gear 46B. Thus, each time an inaudible pulse on the recording is detected the solenoid will be caused to be energized and shaft 82 will move inwardly. This will cause wheel 46 to rotate in the direction indicated by arrow 87, through the engagement of hook 85A with gear 46B. When the solenoid is released, spring 84 biases shaft 82 outwardly of solenoid 81 thereby causing hook 85A to ride up on the back of the succeeding tooth of gear 46B and drop behind and engage the front of said tooth. A resilient finger 86 is connected to jockey 40 by any means and the end of finger 86 is adapted to engage successive teeth on gear 46B, as the gear rotates, to prevent backward rotation of the gear each time hook 58A moves into a new tooth engaging position. It is to be specifically understood that the spacing of the teeth of gear 46B is such that each time gear 46B rotates due to energization of solenoid 81, a new frame 50 will be aligned with the light beam.

In order to insure that gear 46B will be rotated through an arc equal to the spacing between successive teeth on gear 46B to thereby insure proper positioning of successive picture frames 50 in the light beam, a cam 88 is provided and is pivotally mounted to jockey 40 by a pin 89 located intermediate its ends. Cam 88 includes a projection 90 which is adapted to engage the teeth on gear 46A, and an extension 91 which is adapted to abut the upper portion of hook 85A when shaft 82 is in the extended position. A resilient finger 92 is connected to jockey 40 by any conventional means and is adapted to bias cam 88 about pivot 89 to force projection 10 into engagement with a tooth on gear 46A. In the position shown in FIG. 4, hook 85A abuts extension 91 to pivot cam 88 about the axis 89 to lift projection 90 out of engagement with gear 48A. However, when solenoid 81 is energized hook 85A moves out of contact with 91 to rotate wheel 46, and projection 90 rides down the back of a tooth on gear 46A to engage the succeeding tooth and limit rotation of wheel 46, regardless of the distance of travel of arm 85. When the solenoid is deenergized, hook 85A moves back to engage the next tooth on gear 46B, as noted above, and again abuts extension 91 to disengage projection 90 from gear 46A to prepare for the next cycle of operation. Thus, an equal arc of rotation is assured for each operation of the film advance mechanism.

Electric circuit

Figure 11:
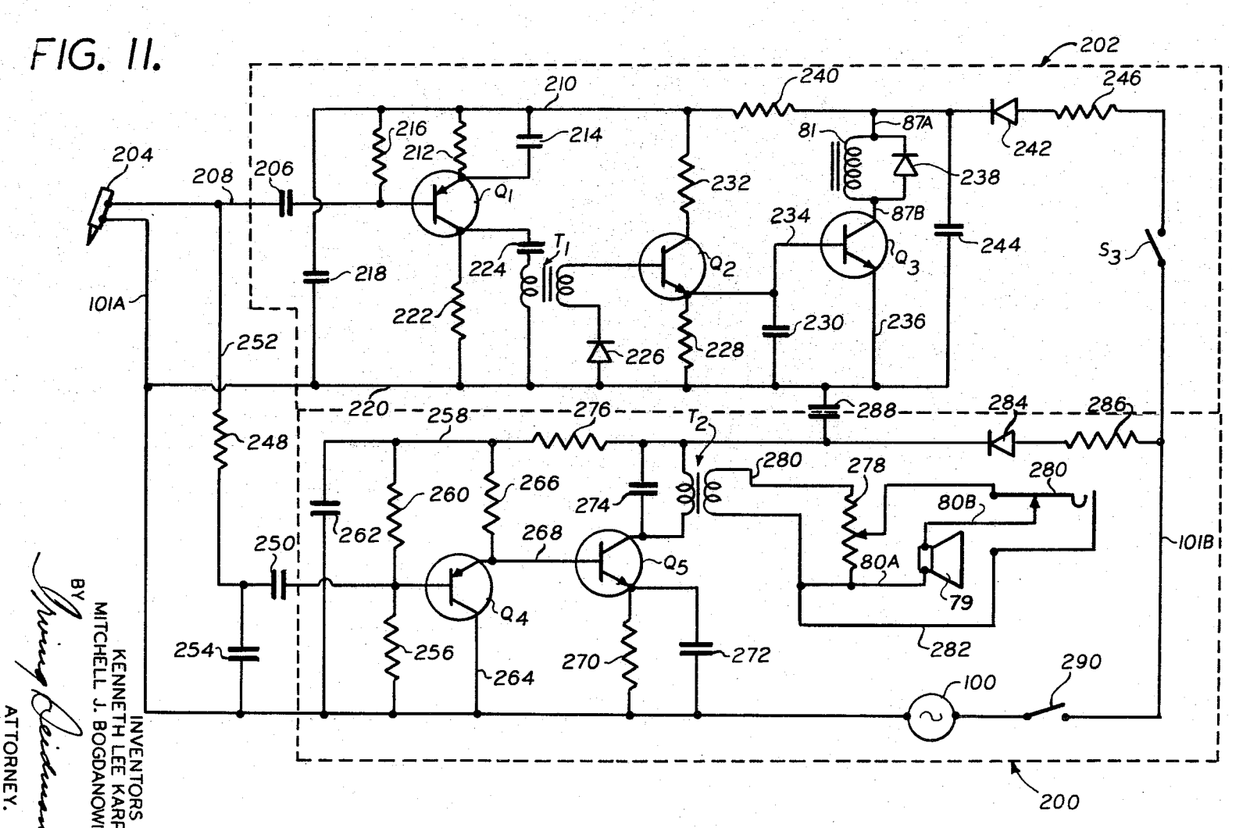
FIG. 11 is a schematic circuit wiring diagram of the sound slide film projector of the present invention.

The electric circuit wiring diagram of the present invention is illustrated in FIG. 11. The electronic circuitry broadly comprises two sections: a sound amplifying section 200; and a control signal detecting section 202. It is to be understood that the electrical components comprising the circuitry are received within the box 76 which is positioned on the upper surface of wall 11.

The detecting section 202 includes a PNP transistor $Q_1$ and NPN transistors $Q_2$ and $Q_3$. The base of the transistor $Q_1$ is connected to one output terminal of a stylus 204, which is mounted on the tone arm 74, through a coupling capacitor 206, by a lead 208. The other output terminal of the stylus 204 is connected to one terminal of an A.C. source of potential 100 by a lead 101A. The emitter of transistor $Q_1$ is connected to a lead 210, through the parallel connection of a resistor 212 and a capacitor 214. The base of transistor $Q_1$ is also connected to the lead 210 through a resistor 216. One terminal of a capacitor 218 is connected to the junction of the resistor 216 and lead 210 and the other terminal of the capacitor is connected to a lead 220 which, in turn, is connected to the lead 101A. The collector of transistor $Q_1$ is connected to the lead 220 through a resistor 222. A series circuit comprising a capacitor 224 and the primary winding of a transformer $T_1$ is connected in parallel with the resistor 222. In the preferred embodiment of the present invention the inaudible signals which control the film advance mechanism are in the order of 10 kc. Hence, the capacitor 224 and the transformer $T_1$ provide a band pass filter which will pass only those signals in the band of frequencies about the 10 kc. range. It is to be understood that the highest frequency of sound signals recorded on the record will be substantially lower than 10 kc., about 8 kc., so that the film advance mechanism will not be triggered by voice signals The base of the transistor $Q_2$ is connected to the lead 220 through the secondary winding of the transformer $T_1$ and a diode 226. The anode of the diode is connected to lead 220. The collector of transistor $Q_2$ is connected to lead 210 through a resistor 232; and the emitter of transistor $Q_2$ is connected to lead 220 through a parallel circuit comprising a resistor 228 and a capacitor 230.

The base of the transistor Q3 is connected to the emitter of transistor $Q_2$ by a lead 234. The emitter of the transistor $Q_3$ is connected directly to the lead 220 by a lead 236. A lead 87B connects the collector of the transistor $Q_3$ to one terminal of a parallel circuit comprising the solenoid winding 81 and a diode 238. The other terminal of the parallel circuit is connected to the lead 210 by a lead 87A. The diode is poled so that the anode is connected to lead 87B.

A resistor 240 is serially connected in the lead 210 between the connection to the resistor 232 and the lead 87A. The lead 210 is connected to the cathode of a diode 242 and a capacitor 244 is connected between the cathode of the diode 242 and the lead 220. A lead 101B connects the anode of the diode 242 to the other terminal of the source 100 through a serially connected resistor 246 and the micro-switch 53. The diode 242 rectifies the alternating potential appearing on the lead 101 and causes a positive potential to exist on the lead 210.

The sound amplifying section 200 includes a PNP transistor $Q_4$ and an NPN transistor $Q_5$. The base of the transistor $Q_4$ is connected to the lead 208, which is connected to the stylus 204, through a series circuit comprising a resistor 248 and a capacitor 250 by a lead 252. One terminal of a capacitor 254 is connected between the resistor 248 and the capacitor 250 and the other terminal is connected to the lead 101A.

The capacitor 254 is provided to bypass the control signals of 10 kc. to lead 101A to thereby prevent amplification of these signals in the section 200. The base of the transistor $Q_4$ is also connected to the lead 101A through a resistor 256 and to a lead 258 through a resistor 260. A capacitor 262 is connected between the junction of lead 258 and the resistor 260 and the lead 101A. The collector of transistor $Q_4$ is connected to lead 101A by a lead 264. The emitter of the transistor $Q_4$ is connected to the lead 258 through a resistor 266.

The base of the transistor $Q_5$ is connected to the emitter of the transistor $Q_4$ by a lead 268. The emitter of transistor $Q_5$ is connected to the lead 101A through the parallel circuit comprising a resistor 270 and a capacitor 272. The collector of the transistor $Q_5$ is connected to the lead 258 through the primary winding of a speaker transformer $T_2$. A capacitor 274 is connected in parallel with the primary winding of $T_2$. A resistor 276 is serially connected in the lead 258 between the connections to the resistor 266 and the capacitor 274.

The secondary winding of $T_2$ is connected across the resistance winding of a potentiometer 278 by a lead 280. The lead 80A connects one terminal of the speaker 77 to one end of the potentiometer 278. The other terminal of the speaker 77 is connected to the wiper arm of the potentiometer, through the normally closed contacts of a conventional phono-jack 280, by a lead 80B. The normally open contact of the phono-jack 280 is connected to the end of the potentiometer 278 by a lead 282. The operation of the jack 280 is conventional. When an external speaker plug is inserted into the jack 280 the normally closed contacts will open thereby opening the circuit about the speaker 77. However, the external speaker will now be connected in the circuit.

The lead 258 is connected to the cathode of a diode 284. The anode of the diode 284 is connected to the lead 101B through a resistor 286. A capacitor 288 is connected between the cathode of the diode 284 and the lead 220.

A single-pole single-throw on-off switch 290 is connected in series with the source 100. It is to be understood that the lamp 34 and the turntable motor are connected across the source 100 by the respective leads 106 and 107. Single-pole single-throw switches may be connected in one of each of the respective leads 106 and 107 to control the energization of the respective devices.

When switch 290 is closed the transistor amplifiers $Q_1$–$Q_5$ will be energized. It is assumed that lamp 34 is illuminated and that the turntable motor is likewise energized. When a record is played, the voice signals detected by the stylus 204 are applied to the base of the transistor $Q_4$. The transistors $Q_4$ and $Q_5$ amplify these signals in the conventional manner and cause these signals to appear across the resistance winding of the potentiometer 278. Depending upon the position of the wiper arm of the potentiometer 278, a portion of the signals are applied to the terminals of the speaker 77. Thus, the potentiometer 278 provides a means for controlling the volume of the device. The inaudible signals for operating the film's advance mechanism will, of course, not be heard.

The signals detected by the stylus 204 will also be applied to the base of the amplifying transistor $Q_1$. However, the filter arrangement comprising $T_1$ and the capacitor 224 will pass only those signals which have frequencies near or at 10 kc. When a control signal is detected it is applied to the base of transistor $Q_2$ and is rectified by the diode 226. $Q_2$ begins to conduct and therefore drives $Q_3$ into conduction. When $Q_3$ conducts the solenoid 81 is energized to cause the film advance mechanism to advance the picture disc one frame, as noted above.

Operation

In operation, cover 9 is removed and disc jockey 40 is moved to the said second position to lie outside casing 10. A preselected picture disc 42 is mounted on wheel 45 with projection 48 extending through slot 51. Wheel 45 is then oriented so projection 48 will pass through notch 64 and jockey 40 is moved back to the said first position to thereby align a preselected picture frame with the light beam when lamp 34 is illuminated. As noted above, jockey 40 acts to close microswitch S3 when in said first position. The record associated with the particular picture disc may then be placed on turntable 70 and the switch may be closed to energize motor 72 to rotate the turntable.

The switch may then be closed to cause lamp 34 to be illuminated to project the image on screen 14A. Tone arm 74 is then placed on the record and the wiper arm of potentiometer 280 may be adjusted to obtain the desired loudness from speaker 77. As the record plays the picture disc will be advanced in accordance with the inaudible signals on the record, as noted above, to maintain the projected picture in synchronism with the recorded sound. At the end of the record picture disc 42 will ideally have made one complete revolution and projection 48 will again be aligned with notch 64 and jockey 40 may be pivoted to the said second position. Thus, switch S3 will open when jockey 40 is moved away from the first position to prevent the operation of the film advancement mechanism. Moreover, as noted above, jockey 40 may be moved so wheel 45 will lie outside casing 10 albeit projection 48 and notch 64 are out of alignment by virtue of door 60, which pivots outwardly.

Accordingly, it is seen that a sound slide film projector has been provided which is compact and highly portable and includes a simple film indexing mechanism and a highly efficient means for advancing the picture frames in synchronism with the recorded sound.

While a preferred embodiment of the present invention has been described it will become apparent to those skilled in the art that modifications may be made therein without departing from the spirit and scope of the invention.

What is claimed is:

1. A slide film projector comprising, a casing having top, bottom, front, rear and side walls, a slot in one of said walls; a lamp housing in said casing adjacent the rear wall, said lamp housing containing a lamp therein; a viewing screen in front of said housing; a lens system in said housing in front of said lamp for directing a beam of light through a picture frame and focusing the image formed thereby on the viewing screen; a disc jockey having a picture disc mounting wheel rotatably mounted thereon, mounting means on said mounting wheel cooperable with means on a picture disc having a plurality of circumferentially spaced picture frames therein for removably mounting the picture disc on said mounting wheel in a preselected position, means mounting said disc jockey on said casing for pivotal movement through said slot between a first position wherein the disc jockey is positioned to align a picture frame with the beam of light when a picture disc is mounted on said mounting wheel, and a second position wherein the mounting wheel is outside said casing to provide for the mounting or removal of a picture disc from said mounting wheel; electro-mechanical means connected to said mounting wheel and responsive to electrical signals for intermittently rotating said mounting wheel to sequentially align respective ones of the plurality of picture frames with the light beam; and indexing means on said casing cooperable with said mounting means and providing for movement of said disc jockey between said positions for one predetermined orientation only of said mounting wheel corresponding to the alignment of a preselected one of the picture frames with the light beam.

2. A device as of the type defined in claim 1, wherein said mounting means comprises an arcuate projection extending across the face of said mounting wheel.

3. A projector as defined in claim 2, wherein the width of said slot prevents passage of said arcuate projection therethrough, and said indexing means comprises a notch extending to the edge of said slot and being sized and positioned to allow passage of said arcuate projection therethrough when the mounting wheel is in said predetermined orientation.

4. A projector as defined in claim 3, wherein said notch is provided in a door on said casing, means pivotally mounting said door on one of said casing walls so the portion of said door containing said notch is movable in the same direction as said disc jockey when said disc jockey is moved from said first to said second position; means on said one of said casing walls cooperable with means on said door for preventing movement of said door in the opposite direction, whereby said projection will abut against and pivot said door to allow passage of said disc jockey when said disc jockey is moved from the first to the second position and said projection and notch are out of alignment.

5. A projector as defined in claim 1, wherein said electro-mechanical means comprises, in combination, a gear, having a plurality of teeth, affixed to said mounting wheel and rotatable therewith; a solenoid responsive to electrical signals applied across its terminal to move a shaft from a first position to a second position; and an arm connected to said shaft and engageable with a respective tooth on said gear to rotate said gear when said shaft moves from said first to said second position and to engage the succeeding tooth on the gear when said shaft moves back to said first position.

6. A projector as defined in claim 5, wherein said gear is provided with two sets of teeth, each set of teeth extending in opposite directions; a resilient finger engaging the set of teeth engaged by said arm to prevent backward rotation of said gear when said arm moves to engage succeeding teeth; and a cam engageable with respective ones of the other set of teeth during rotation of said gear to limit rotation of said gear, said arms abutting said cam to move said cam out of tooth engaging position when the shaft is in said first position.

7. A slide film projector of the type described comprising a casing having top, bottom, front, rear and side walls, said casing having a slot in one of said walls; a lamp housing in said casing adjacent the rear wall, said lamp housing containing a lamp therein; a viewing screen in front of said housing; a lens system in said housing in front of said lamp for directing a beam of light through a picture frame and focusing the image formed thereby on the viewing screen; first means movably mounted on said casing and adapted to receive a picture disc having a plurality of circumferentially spaced picture frames therein in a predetermined position thereon; said first means being movable through said slot between a first position wherein a respective one of the plurality of picture frames is aligned with said light beam when a picture disc is mounted thereon, and a second position whereby a picture disc may be mounted on or removed from said first means; and electro-mechanical means connected to said first means and responsive to electrical signals for rotating said first means to sequentially align respective ones of the plurality of picture frames with the light beam.

8. A device of the type defined in claim 7 and indexing means on said casing cooperable with said first means and providing for movement of said first means between said positions for one predetermined orientation only of said first means.

9. A sound slide film projector comprising, in combination, a casing having top, bottom, front, rear and side walls, a slot in one of said walls; a lamp housing in said casing adjacent the rear wall, said lamp housing containing a lamp therein; a viewing screen in the front wall of said casing; a lens system in said housing in front of said lamp for directing a beam of light through a picture frame and focusing the image formed thereby on the viewing screen; a disc jockey having a picture disc mounting wheel rotatably mounted thereon, mounting means on said mounting wheel cooperable with means on a picture disc having a plurality of circumferentially spaced picture frames therein for removably mounting the picture disc on said mounting wheel in a preselected position; means mounting said disc jockey on said casing for pivotal movement through said slot between a first position wherein the disc jockey is positioned to align a picture frame with the beam of light when a picture disc is mounted on said mounting wheel, and a second position wherein the mounting wheel is outside said casing to provide for the mounting or removal of a picture disc from said mounting wheel; a turntable rotatably mounted on the top wall of said casing, a motor mounted on the underside of said top wall and having a rotatable output shaft in contact with said turntable for rotating said turntable; a tone arm mounted on said top wall and containing a stylus therein for converting the undulations on a record into electrical signals; circuit means responsive to said electrical signals for amplifying said signals, a speaker mounted within said casing, means interconnecting said stylus and said circuit means and said circuit means and said speaker to provide for the reproduction of sound recorded on a record; and electro-mechanical means responsive to preselected signals recorded on the record for intermittently rotating said mounting wheel to sequentially align respective ones of the plurality of picture frames with the light beam.

10. A sound slide film projector as defined in claim 9, and indexing means on said casing cooperable with said mounting means and providing for movement of said disc jockey between said positions for one predetermined orientation only of said mounting wheel corresponding to the alignment of a preselected one of the picture frames with the light beam.

11. A sound slide film projector as defined in claim 9, and detecting means for detecting the preselected signals, means connecting said detecting means between said stylus and said electro-mechanical means; the preselected signals being of a relatively high frequency, the detecting means comprising a band-pass filter adapted to pass the preselected signals and to attenuate signals of other frequencies.

12. A slide film projector comprising in combination, a casing having top, bottom, front, rear and side walls, a slot in one of said walls; a lamp housing in said casing adjacent the rear wall, said lamp housing containing a lamp therein; a viewing screen in front of said housing; a lens system in said housing in front of said lamp for directing a beam of light through a picture frame and focusing the image formed thereby on the viewing screen; a picture disc having a plurality of circumferentially spaced picture frames therein, each of said frames being equally spaced from the axis of the disc, said disc being provided with mounting means; first means movably supported on said casing and cooperable with said mounting means to mount said picture disc thereon in a predetermined position; said first means being movable through said slot between a first position wherein a respective one of the plurality of picture frames is aligned with said light beam when a picture disc is mounted thereon, and a second position whereby a picture disc may be mounted on or removed from said first means; and electro-mechanical means connected to said first means and responsive to electrical signals for rotating said first means to sequentially align respective ones of the plurality of picture frames with the light beam.

13. A slide film projector as defined in claim 12, and indexing means on said casing cooperable with said first means and providing for movement of said first means between said positions for one predetermined orientation only of said first means.

14. A slide film projector as defined in claim 13 wherein said notch is provided in a door on said casing, means pivotally mounting said door on one of said casing walls so the portion of said door containing said notch is movable in the same direction as said disc jockey when said disc jockey is moved from said first to said second position; means on said one of said casing walls cooperable with means on said door for preventing movement of said door in the opposite direction, whereby said projection will abut against and pivot said door to allow passage of said disc jockey when said disc jockey is moved from the first to the second position and said projection and notch are out of alignment.

15. A slide film projector as defined in claim 12, wherein said first means comprises, in part, a mounting wheel having a centrally located arcuate projection across the face thereof, and said mounting means comprises a centrally located arcuate slot which is sized to snugly receive the arcuate projection therein.

16. A picture disc adapted for use in a sound slide film projector having a casing having top, bottom, front, rear and side walls, a slot in one of said walls; a lamp housing in said casing adjacent the rear wall, said lamp housing containing a lamp therein, a viewing screen in said front wall, a lens system in said housing in front of said lamp for directing a beam of light through a picture frame and focusing the image formed thereby on the viewing screen; a disc jockey having a picture disc mounting wheel rotatably mounted thereon, mounting means on said mounting wheel for mounting a picture disc thereon, means mounting said disc jockey on said casing for pivotal movement through said slot between a first position wherein the disc jockey is positioned to align a picture frame with the beam of light when a picture disc is mounted on said mounting wheel, and a second position wherein the mounting wheel is outside said casing to provide for the mounting or removal of a picture disc from said mounting wheel, and electromechanical means connected to the mounting wheel and responsive to electrical signals for intermittently rotating said mounting wheel through a predetermined arc; said picture disc including a plurality of circumferentially spaced apertures therethrough, each of said apertures being equally spaced from the axis of said disc; a plurality of picture frames, respective ones of said plurality of picture frames being received in different ones of said plurality of apertures; means to maintain said picture frames in place, and cooperating means centrally located and cooperable with the mounting means on said mounting wheel for mounting said disc on said mounting wheel in a preselected position.

17. A picture disc as defined in claim 16, wherein the spacing between picture frames is such that a different picture frame will be aligned with the light beam each time said mounting wheel is rotated through said predetermined arc.

18. A picture disc as defined in claim 17, wherein the mounting means is an arcuate projection extending across the face of said mounting wheel and said cooperating means comprises an arcuate slot sized to snugly receive the arcuate projection therethrough.

19. Advancing means for advancing the film in a sound slide film projector having a casing having top, bottom, front, rear and side walls, a slot in one of said walls; a lamp housing in said casing adjacent the rear wall, said lamp housing containing a lamp therein; a viewing screen in front of said housing; a lens system in said housing in front of said lamp for directing a beam of light through a picture frame and focusing the image formed thereby on the viewing screen; a disc jockey having a picture disc mounting wheel rotatably mounted thereon; mounting means on said mounting wheel cooperable with means on a picture disc having a plurality of circumferentially spaced picture frames therein for removably mounting the picture disc on said mounting wheel in a preselected position; means mounting said disc jockey on said casing for pivotal movement through said slot between a first position wherein the disc jockey is positioned to align a picture frame with the beam of light when a picture disc is mounted on said mounting wheel, and a second position wherein the mounting wheel is outside said casing to provide for the mounting or removal of a picture disc from said mounting wheel; a turntable rotatably mounted on the top wall of said casing, a motor mounted on the underside of said top wall and having a rotatable output shaft in contact with said turntable for rotating said turntable; a tone arm mounted on said top wall and containing a stylus therein for converting the undulations on a record into electrical signals; said advancing means comprising electro-mechanical means responsive to preselected signals recorded on the record for intermittently rotating said mounting wheel to sequentially align respective ones of the plurality of picture frames with the light beam, and detecting means for detecting the preselected signals, means connecting said detecting means between said stylus and said electro-mechanical means; the preselected signals being of a relatively high frequency, the detecting means comprising a band-pass filter adapted to pass the preselected signals and to attenuate signals of other frequencies.

References Cited
UNITED STATES PATENTS

| | | | |
|---|---|---|---|
| 2,477,032 | 7/1949 | Asherman | 88—27 |
| 2,618,197 | 11/1952 | Boushey | 88—27 |
| 2,887,006 | 5/1959 | Yale | 88—27 |
| 3,245,312 | 5/1966 | Paull | 88—28 |

NORTON ANSHER, *Primary Examiner.*

R. M. SHEER, *Assistant Examiner.*